United States Patent [19]
Combs et al.
[11] Patent Number: 5,067,220
[45] Date of Patent: Nov. 26, 1991

[54] FRONT WHEEL DRIVE HUB PULLER

[75] Inventors: Todd M. Combs, Jackson; Gary K. Deraedt, Rives Junction; Duane A. Goodrich, Battle Creek, all of Mich.

[73] Assignee: Dowley Manufacturing, Inc., Spring Arbor, Mich.

[21] Appl. No.: 625,416

[22] Filed: Dec. 11, 1990

[51] Int. Cl.[5] .............................................. B23P 19/04
[52] U.S. Cl. ...................................................... 29/259
[58] Field of Search ................. 29/263, 264, 259, 260, 29/266

[56] References Cited

U.S. PATENT DOCUMENTS 1,465,124 8/1923 Gardner ................................ 29/263
4,492,014 1/1985 Alexander ............................. 29/259
4,646,412 3/1987 Eade ...................................... 29/264

*Primary Examiner*—Robert C. Watson
*Attorney, Agent, or Firm*—Beaman & Beaman

[57] ABSTRACT

A hub puller for removing hubs from axle bearings on front wheel drive vehicles including a yoke having a pair of adjustably spaced arms extending therefrom adapted to engage the vehicle knuckle housing. An elongated threaded shaft includes an inner end upon which an adapter is adjustably mounted for engaging the hub's inner end, and an outer end which passes through the hub and a hole in the yoke to receive a thrust bearing and actuating nut. Rotating the nut causes the shaft to translate through the yoke to axially displace the hub from the knuckle bearing.

3 Claims, 1 Drawing Sheet

FRONT WHEEL DRIVE HUB PULLER

BACKGROUND OF THE INVENTION

Front wheel drive vehicles commonly include a front hub and axle bearing knuckle assembly wherein the axle bearing's outer race is received within a knuckle and the hub is press fit to the axle bearing's inner race to rotatably support the hub with respect to the knuckle. A typical hub includes a cylindrical portion adjacent an inner end and an annular flange adjacent an outer end having a plurality of circumferentially spaced threaded studs for mounting a wheel thereto. The hub is press fitted into the bearing inner race and an axial passage extends throughout the length of the hub to receive a drive shaft.

Occasionally, the situation arises where it is necessary to remove the hub from the axle bearing for replacing or servicing, and a significant axial force must be applied to the hub to overcome the frictional forces between the hub and axle bearing to permit separation thereof.

While special tools have been devised to assist the mechanic in removing the hub from front wheel drive axle bearings an easy-to-use economical and universal tool is not available. For instance, presently available tools are difficult to assemble and often require the mechanic to have to reach around or under the knuckle which supports the axle bearing and hub assembly. While it is sometimes necessary to remove the axle bearing, some tools do not permit removal of the hub unless the axle bearing or other internal parts are removed, and such tools are not readily adapted to accommodate various makes of vehicles and hub sizes.

It is an object of the invention to provide a hub puller for removing hubs from front wheel drive axle bearings wherein the hub puller is easily applied to the hub and is simple to operate.

Another object of the invention is to provide a hub puller for removing hubs from front wheel drive axle bearings wherein the hub puller is readily modified to accommodate various makes of vehicles and hub sizes.

A further object of the invention is to provide a hub puller for removing hubs from front wheel drive axle bearings wherein the hub puller permits the mechanic to work in the "open" area away from behind the knuckle which supports the axle bearing and hub.

Still a further object of the invention is to provide a hub puller for removing hubs from front wheel drive axle bearings wherein the hub puller permits the hub to be removed without the necessity of removing other internal parts, such as the axle bearing, yet, if necessary, the hub puller may be readily adapted to remove the axle bearing.

Another object of the invention is to provide a hub puller of simple construction which is easy to use, dependable in operation, and economical to manufacture.

In the practice of the invention the hub puller includes a relatively flat yoke having an inner side, an outer side, and a central hole extending therethrough. A pair of parallel, spaced anchor arms are adjustable mounted to the yoke by fasteners and extend in a common direction from the inner side. An elongated threaded shaft having a diameter slightly smaller than the diameter of the yoke's central hole includes an inner end adapted to releasably receive an annular adapter for engaging the hub to be removed and an outer end which passes through the yoke's hole. A thrust bearing is slidably mounted on the shaft's outer end and is of a diameter larger than the diameter of the yoke's central hole. An actuating nut threaded upon the shaft forces the thrust bearing against the yoke's outer side to draw the adapter toward the yoke.

In a typical application the hub puller is used to remove a hub from a front wheel drive axle bearing wherein the axle bearing is received within a cylindrical socket defined in a knuckle housing and the hub is press fitted to the inner race of the axle bearing. An axial bore extends throughout the hub from an inner end to an outer end adjacent an annular flange upon which a wheel is adapted to be mounted.

In use, after removing the drive shaft from the hub's bore, the hub puller's yoke is positioned adjacent the hub's flange and the spacing between the arms is adjusted by the fasteners so that the arms' ends extend around the flange and engage a portion of the knuckle housing. The threaded shaft is passed through the yoke central hole and hub's bore and the adapter is positioned on the shaft to engage the hub's inner end. The thrust bearing is located on the shaft's outer end between the yoke and the actuating nut and engages the yoke as the nut is tightened.

The actuating nut may be initially hand tightened and then a conventional wrench or air wrench may be applied to the nut's wrench engaging flats to provide further rotation. As rotation of the nut occurs, the thrust bearing is forced against the yoke's outer side which compresses and forces the arms against the knuckle housing and causes the shaft to axially translate in the direction of the yoke whereby the adapter axially displaces the hub with respect to the axle bearing to permit removal of the hub from the axle bearing.

The particular adapter mounted on the shaft may be selected to accommodate the hub puller for various hub sizes, and, if necessary, an adapter may be utilized which is of sufficient diameter to engage the axle bearing for removing the axle bearing from the housing. As a variety of adapters may be utilized with the hub puller, and the spacing between the arms is adjustable, the hub puller is readily applied, easy to operate and accommodates various makes of vehicles and hub sizes.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
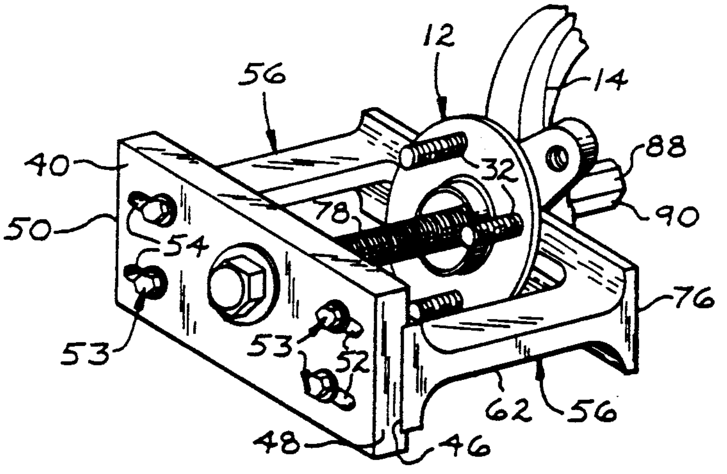
FIG. 1 is a perspective view illustrating the hub puller of the invention in a typical application removing a hub from the axle bearing of a front wheel drive vehicle.
Figure 2:
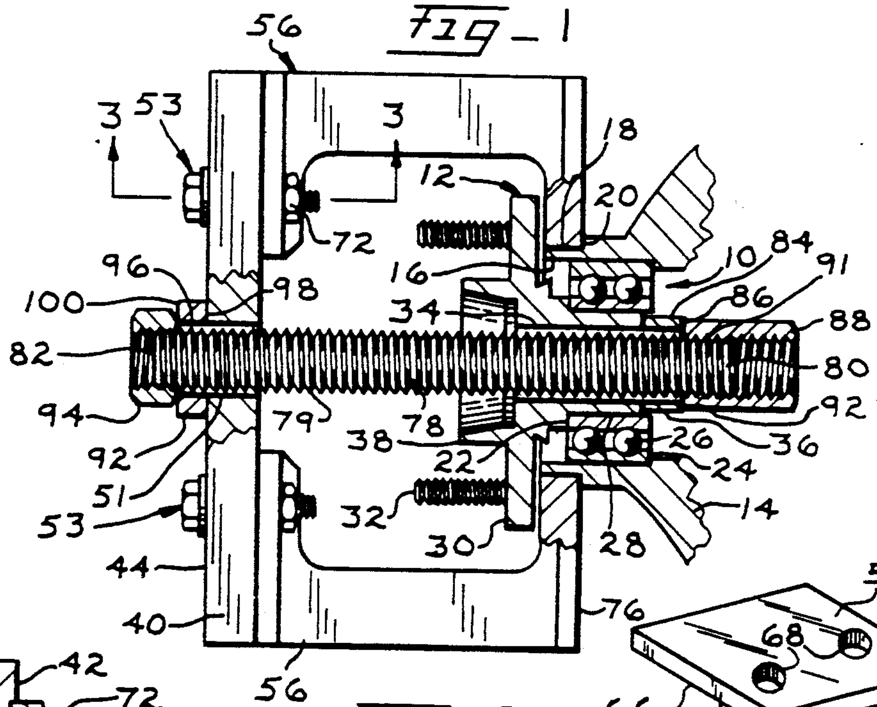
FIG. 2 is an elevational diametrical view, partially sectioned, illustrating the hub puller during removal of the hub from the axle bearing.
Figure 3:
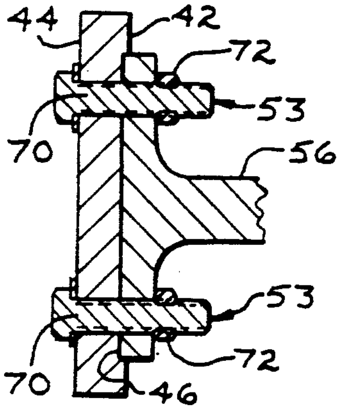
FIG. 3 is an elevational, sectional view as taken along Section 3—3 of FIG. 2.
Figure 4:
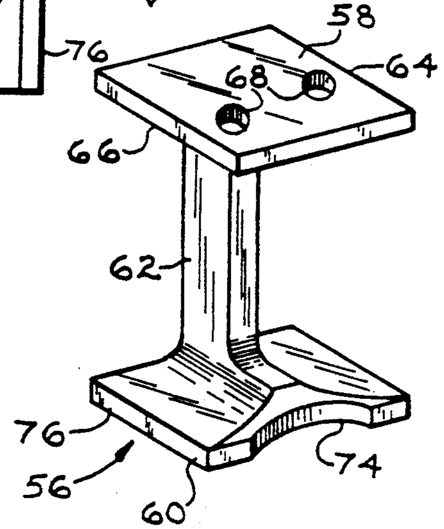
FIG. 4 is a perspective view of a leg, per se.

Referring to FIGS. 1 and 2, a typical application is illustrated wherein the hub puller of the invention is being utilized to remove a hub from the front axle bearing of a front wheel drive vehicle. The axle bearing 10 and hub 12 are supported by a knuckle housing 14 having a cylindrical socket opening 16 extending therethrough for receiving the axle bearing 10 and an outer concentric cylindrical surface 18 adjacent an annular radial abutment shoulder surface 20.

The axle bearing 10 includes inner and outer races 22 and 24, respectively, having balls 26 disposed therebetween. The outer diameter of the outer race 24 is firmly press fitted into the diameter of the socket opening 16 whereby sufficient frictional force is created between the race 24 and knuckle housing 14 to prevent relative axial displacement and rotation.

The hub 12 includes a cylindrical portion 28 and an annular flange 30 having circumferentially spaced stud bolts 32 extending therefrom for mounting a wheel (not shown). An axial bore 34 extends throughout the length of the hub 12 intersecting an inner end 36 adjacent the cylindrical portion 28 and an outer end 38 adjacent the flange 14. The outer diameter of the portion 28 is press fitted into the inner diameter of the race 22 whereby upon the inner end 36 being inserted and axially forced within the race 22, as known, sufficient frictional force is created between the race 22 and hub 12 to prevent rotation between the same.

Referring to FIGS. 1–4, the hub puller of the invention includes a relatively flat rectangular yoke 40 including an inner side 42 and an outer side 44. A linear groove 46 is defined in the side 42 extending the length of the yoke 40 as defined by ends 48 and 50. A central hole 51 extends through the yoke spaced equidistance from the ends. Two pairs of parallel, spaced elongated slots 52 and 54 extend through the yoke 40 intersecting the side 44 and groove 46. The slots 52 and 54 extend in the direction of the length of the yoke 40 and are adapted to receive bolt and nut fasteners 53 to adjustably mount a pair of identical arms 56 to the yoke 40 within the groove 46.

The arms 56 are formed as an I beam and include relatively flat rectangular heads 58 and 60 joined by a central portion 62. The width of the head 58, as defined by the edges 64 and 66, is adapted to be closely slidably received within the yoke's groove 46 whereby holes 68 provided in the head 58 align with one of the pairs of slots 52 or 54 to receive fasteners 53 which comprise a headed threaded bolt 70 and complementary nut 72 to mount the arms to the yoke 40. The mounted arms extend in parallel spaced relation from the yoke's side 42, and the heads 60 include concave recesses 74 which oppose one another and are adapted to receive the outer cylindrical surface 18 of the knuckle housing. The spacing between the heads 60 is adjusted by loosening the fasteners 53 to permit the arms to slide within the groove 46 whereby the fasteners 53 slide within the associated slots and may be tightened to maintain the desired spacing between the arms. The outer side of the heads 60 defines an abutment surface 76, FIG. 2, for engaging the knuckle housing's annular shoulder 20.

The hub puller also includes an elongated threaded shaft 78 having threads 79 of a diameter slightly less than the diameter of the yoke's hole 51, and the shaft includes an inner end 80 and an outer end 82. An annular adapter 84, FIG. 2, includes a smooth bore 86 of a diameter slightly greater than the diameter of the shaft 78 so as to be slidable thereon. A nut 88, having internal threads complimentary to the shaft's threads and exterior wrench engaging flats 90, is threaded on the inner end and includes a flat radial surface 91 for engaging the end of the adapter 84. It is to be understood that a plurality of adapters are available for use with the hub puller, and the outer diameter of each adapter will be of different dimensions to permit the hub puller to be utilized with a variety of hubs.

A slidably mounted thrust bearing 92 and an actuating nut 94 circumscribe the shaft end 82. The thrust bearing 92 is of an annular configuration having a smooth bore 96, FIG. 2, of a diameter slightly greater than the diameter of the shaft 78 and flat radial face surfaces 98 and 100. The outer diameter of the thrust bearing 92 is substantially larger than the diameter of the hole 51 whereby the face 98 is adapted to engage the yoke's side 44, and the face 100 is engaged by the actuating nut 94.

The actuating nut 94 comprises a conventional nut having an internal threaded bore for threadedly engaging the shaft's thread 79, and the nut is of an exterior hexagonal configuration of the known type.

To install the hub puller of the invention for removing the hub 12 from the axle bearing 10 and knuckle housing 14, the fasteners 53 are loosened to permit the spacing between the arms 56 to be adjusted whereby the arms are positioned such that the recesses 74 of the heads 60 engages the knuckle housing's cylindrical surface 18, the side 76 engages the annular shoulder 20, and the yoke's hole 51 coaxially aligns with the hub's bore 34. Tightening of the fasteners 53 securely fastens the arms 56 to the yoke to maintain the hub puller in position upon the knuckle housing 14.

Upon positioning the yoke and arms upon the knuckle housing 14, the nut 88 is threaded on the shaft's inner end 82 and the thrust bearing 92 is inserted over the shaft. The shaft 78 is passed through the yoke's hole 51 and the shaft end is inserted through the hub bore 34. The adapter 84 is placed over the shaft end 80 and the nut 88 is threaded thereon. Initial tightening of the actuating nut 94 may be accomplished by hand to position the thrust bearing 92 into engagement with the yoke's side 44 and the nut 88 is tightened to force the adapter into engagement with the hub inner end 36.

Further rotation of the actuating nut 94 is accomplished by applying a conventional wrench or air wrench to the wrench engaging flats. As the actuating nut is rotated, the thrust bearing 92 is forced against the yoke 40 causing the arms 56 to be placed under compression and press firmly against the knuckle housing shoulder 20 and the shaft to translate to the left, FIG. 2. This forces the adapter 84 against the hub's inner 36 end whereby sufficient axial force is applied to the hub 12 to overcome the frictional force between the hub and inner race to axially push the hub out of the axle bearing 10. Such rotation of the actuating nut 94 continues until the hub 12 is fully separated from the axle bearing.

It should be understood that the frictional force between the inner race 22 and hub 12 is less than the frictional force between the outer race 24 and socket opening 16 which permits the axle bearing to remain within knuckle housing 14 as the hub is removed. The hub puller may also be utilized to remove the axle bearing 10 from the housing 14. This is accomplished by selecting an adapter having an outer diameter of sufficient dimension to engage a race of the axle bearing, and using the hub puller in the same manner as described.

The hub puller is easily applied to the knuckle housing 14, and as the actuator nut 94 is not located behind the knuckle housing, the mechanic may easily apply a wrench thereto to for conveniently rotating the nut to remove the hub. The use of a plurality of adapters having various outer diameters permits the hub puller to be used with a wide variety of hub sizes, and for removing axle bearings as well, which extends the versatility of the hub puller. The adjustability of arms 56 permits the hub puller to be easily installed on the knuckle housing and accommodate various makes of vehicles, and the hub puller is of a simple construction which is dependable in use and of economical manufacture.

It is appreciated that various modifications to the inventive concepts may be apparent to those skilled in the art without departing from the spirit and scope of the invention.

We claim:

1. A hub puller for removing hubs from the bearing of front wheel drive vehicles having a knuckle housing wherein the housing includes a bearing having an axis and an exterior outwardly facing shoulder surface transversely disposed to the bearing axis adjacent a knuckle housing cylindrical surface concentric to the bearing axis, and an annular hub press fitted into the bearing having an inner end, in combination an elongated yoke having a central region and first and second sides, a pair of compression resistant arms extending from said first yoke side, each of said arms having a free end, a head defined on each arm free end, an abutment surface defined upon each arm head facing away from said yoke adapted to engage the knuckle housing shoulder surface, a concave cylindrical surface defined upon each arm head adapted to engage the knuckle housing cylindrical surface when the arms' abutment surface engages the housing shoulder, a threaded shaft having an inner end extending between said arm heads and an outer end extending through said yoke central region, an adapter mounted on said shaft inner end adapted to engage the hub inner end, and threaded drive means associated with said shaft and yoke for axially displacing said shaft through said yoke and the hub toward said yoke.

2. In a hub puller as in claim 1, said drive means comprising a nut rotatably mounted on said shaft axially fixed relative to said yoke, and an adapter nut threaded upon said shaft inner end engaging said adapter.

3. In a hub puller as in claim 1, means adjustably mounting said arms upon said yoke for movement toward and away from each other, said adjustably mounting means comprising a pair of parallel spaced slots defined in said yoke on each side of said central region extending in the direction of the length of said yoke, and a pair of threaded fasteners associated with each arm and received with said slots whereby tightening of said fasteners rigidly affixes said arms to said yoke and resists rotation of said arms relative to said yoke.

* * * * *